US009060176B2

(12) United States Patent
Bossen et al.

(10) Patent No.: US 9,060,176 B2
(45) Date of Patent: Jun. 16, 2015

(54) MOTION VECTOR PREDICTION IN VIDEO CODING

(75) Inventors: Frank J. Bossen, Mountain View, CA (US); Sandeep Kanumuri, Sunnyvale, CA (US)

(73) Assignee: NTT DOCOMO, INC., Tokyo (JP)

( * ) Notice: Subject to any disclaimer, the term of this patent is extended or adjusted under 35 U.S.C. 154(b) by 566 days.

(21) Appl. No.: 12/890,400

(22) Filed: Sep. 24, 2010

(65) Prior Publication Data

US 2011/0080954 A1 Apr. 7, 2011

Related U.S. Application Data

(60) Provisional application No. 61/247,875, filed on Oct. 1, 2009.

(51) Int. Cl.
*H04N 7/26* (2006.01)
*H04N 19/577* (2014.01)
*H04N 19/52* (2014.01)
(Continued)

(52) U.S. Cl.
CPC ............. *H04N 19/577* (2014.11); *H04N 7/26* (2013.01); *H04N 19/52* (2014.11); *H04N 19/573* (2014.11)

(58) Field of Classification Search
CPC ........... H04N 7/26; H04N 7/12; H04N 11/02; H04N 711/04; H04N 5/91; H04N 19/0066; H04N 19/00575; H04N 19/0003; H04N 19/00696; H04N 19/00024; H04N 19/0545; H04N 19/00351; H04N 19/00175; H04N 19/00672; H04N 19/0096; H04N 19/00624; H04N 19/00715; H04N 19/00721; H04N 19/00733; H04B 1/66; G06K 9/00

USPC ............. 375/240.16, 240.18, 240.22, 375/240.23–240.29, 246, 244, 253, 375/E07.125, 240.24, 240.12, E07.243
See application file for complete search history.

(56) References Cited

U.S. PATENT DOCUMENTS 5,943,445 A * 8/1999 Dufaux ................. 382/236
5,978,030 A * 11/1999 Jung et al. ............ 375/240.16
6,654,420 B1 * 11/2003 Snook .................. 375/240.16

(Continued)

FOREIGN PATENT DOCUMENTS

EP 1377067 A1 1/2004
EP 1482742 A2 5/2004

OTHER PUBLICATIONS

"Motion Vector Prediction With Reference Frame Consideration" by Alexis M. Tourapis, Proc. of SPIE Bellingham, WA, 2003, vol. 5203 pp. 440-446.*

(Continued)

*Primary Examiner* — Dave Czekaj
*Assistant Examiner* — Dramos I Kalapodas
(74) *Attorney, Agent, or Firm* — Blakely, Sokoloff, Taylor & Zafman LLP

(57) ABSTRACT

A method and apparatus is disclosed herein for motion vector prediction and coding. In one embodiment, the method comprises: deriving N motion vector predictors for a first block that has N motion vectors corresponding to N lists of reference frames and a current frame, including constructing one of the N motion vector predictors when a second block that neighbors the first block and is used for prediction has at least one invalid motion vector, where N is an integer greater than 1; generating N differential motion vectors based on the N motion vectors and N motion vector predictors; and encoding the N differential motion vectors.

25 Claims, 7 Drawing Sheets

(51) Int. Cl.
*H04N 19/573* (2014.01)
*H04N 19/00* (2014.01)

(56) References Cited

U.S. PATENT DOCUMENTS

| | | | |
|---|---|---|---|
| 7,003,035 B2* | 2/2006 | Tourapis et al. | 375/240.12 |
| 7,940,845 B2* | 5/2011 | Kondo et al. | 375/240.16 |
| 8,155,193 B2* | 4/2012 | Kato et al. | 375/240.16 |
| 8,711,937 B2* | 4/2014 | Joch et al. | 375/240.16 |
| 2004/0001546 A1* | 1/2004 | Tourapis et al. | 375/240.12 |
| 2004/0008784 A1* | 1/2004 | Kikuchi et al. | 375/240.16 |
| 2004/0223548 A1* | 11/2004 | Kato et al. | 375/240.16 |
| 2005/0053134 A1* | 3/2005 | Holcomb | 375/240.12 |
| 2005/0053137 A1* | 3/2005 | Holcomb | 375/240.16 |
| 2005/0053149 A1* | 3/2005 | Mukerjee et al. | 375/240.16 |
| 2005/0117646 A1* | 6/2005 | Joch et al. | 375/240.16 |
| 2006/0153300 A1* | 7/2006 | Wang et al. | 375/240.16 |
| 2006/0245497 A1* | 11/2006 | Tourapis et al. | 375/240.16 |
| 2006/0280253 A1* | 12/2006 | Tourapis et al. | 375/240.16 |
| 2007/0014358 A1* | 1/2007 | Tourapis et al. | 375/240.15 |
| 2007/0183502 A1* | 8/2007 | Haskell et al. | 375/240.16 |
| 2008/0181308 A1* | 7/2008 | Wang et al. | 375/240.16 |
| 2009/0067497 A1* | 3/2009 | Jeon | 375/240.15 |
| 2009/0168884 A1* | 7/2009 | Lu et al. | 375/240.16 |
| 2009/0168890 A1* | 7/2009 | Holcomb | 375/240.16 |
| 2009/0207914 A1* | 8/2009 | Choi et al. | 375/240.15 |
| 2009/0304084 A1* | 12/2009 | Hallapuro et al. | 375/240.16 |
| 2010/0020877 A1* | 1/2010 | Au et al. | 375/240.16 |
| 2012/0243611 A1* | 9/2012 | Kondo | 375/240.16 |
| 2012/0320969 A1* | 12/2012 | Zheng et al. | 375/240.02 |

OTHER PUBLICATIONS

"Motion Vector Prediction With Reference Frame Consideration" by Alexix M. Tourapis et al., SPIE 2003, No. 0277-786X/03.*
PCT International Search Report for corresponding PCT Patent Application No. PCT/US2010/050572, Nov. 25, 2010, 7 pgs.
PCT Written Opinion of the International Searching Authority for corresponding PCT Patent Application No. PCT/US2010/050572, Nov. 25, 2010, 10 pgs.
Xiangyang Ji, et al., "New BI-Prediction Techniques for B Pictures Coding", 2004 IEEE International Conference on Multimedia and Expo, Jun. 2004, pp. 101-104.
Gulllaume Laroche, et al., "Competition Based Prediction for Skip Mode Motion Vector Using Macroblock Classification for the H.264 JM KTA Software", Advanced Concepts for Intelligent Vision Systems, Aug. 28, 2007, pp. 789-799.
Alexis M. Tourapis, "Motion Vector Prediction With Reference Frame Consideration", Proceedings of International Society for Optical Engineering, Jan. 1, 2003, pp. 440-447, vol. 5203.
PCT Intertnational Preliminary Report on Patentability for related PCT Patent Application No. PCT/US2010/050572, Apr. 12, 2012, 10 pgs.

* cited by examiner

MOTION VECTOR PREDICTION IN VIDEO CODING

PRIORITY

The present patent application claims priority to and incorporates by reference the corresponding provisional patent application Ser. No. 61/247,875, titled, "Motion Vector Prediction in Video Coding", filed on Oct. 1, 2009.

FIELD OF THE INVENTION

Embodiments of the present invention relate to the field of video coding for compression. In particular, embodiments of the invention are related to the prediction and differential coding of motion vectors.

BACKGROUND OF THE INVENTION

Block-based motion compensation is an integral operation in a variety of video codecs that exploits temporal correlation to achieve compression of video data. However, one needs to signal motion vector(s) of each block to the decoder so that the process of motion compensation can be replicated at the decoder. The efficiency of compression achieved by motion compensation is dependent on the efficiency with which motion vectors are signaled. Typically, a predictor is derived for each motion vector from a causal neighborhood and only the difference is coded as part of the bitstream. Existing techniques do not exploit all the redundancy in deriving the predictor and hence there is scope for improvement.

SUMMARY OF THE INVENTION

A method and apparatus is disclosed herein for motion vector prediction and coding. In one embodiment, the method comprises: deriving N motion vector predictors for a first block that has N motion vectors corresponding to N lists of reference frames and a current frame, including constructing one of the N motion vector predictors when a second block that neighbors the first block and is used for prediction has at least one invalid motion vector, where N is an integer greater than 1; generating N differential motion vectors based on the N motion vectors and N motion vector predictors; and encoding the N differential motion vectors.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
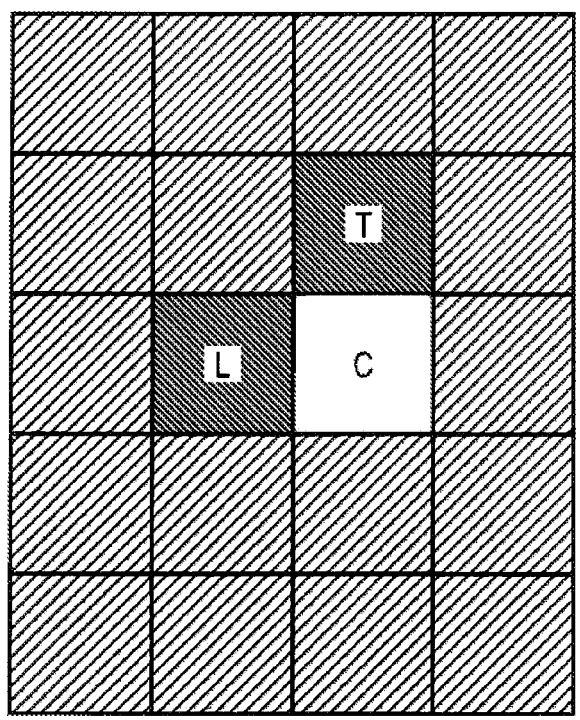
FIG. 1 illustrates causal neighbor blocks used to construct predictors for the motion vectors of another block.

Embodiments of the current invention include methods to enhance the predictors thereby reducing the number of bits spent to signal the motion vectors. In particular, embodiments of the current invention include techniques to enhance the prediction of motion vectors for blocks coded in bi-predictive or multi-predictive modes by exploiting the correlation across two or more lists of reference frames.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

In the prior art, a motion vector (MV) is signaled by coding a differential motion vector (MVD) where the differential motion vector is the difference between the motion vector and a motion vector predictor ($\overline{MVP}$), i.e. MVD=MV-$\overline{MVP}$.

A bi-predictive block has two motion vectors, $MV_0$ and $MV_1$, corresponding to two lists of reference frames, list 0 and list 1, respectively, and they are both signaled using differential motion vectors.

$$MVD_0 = MV_0 - \overline{MVP_0}$$

$$MVD_1 = MV_1 - \overline{MVP_1}$$

where $MVD_0$ and $MVA_1$ represent the differential motion vectors and $\overline{MVP_0}$ and $\overline{MVP_1}$ represent the motion vector predictors for list 0 and list 1 respectively. A multi-predictive block is a generalization of the concept of a bi-predictive block. A multi-predictive block has N motion vectors corresponding to N lists of reference frames where N is an integer greater than 1. In the following description, the present invention is explained in the context of a bi-predictive block for the sake of clarity. However, it is to be noted that the present invention is also applicable to the general case of a multi-predictive block.

The motion vector predictors are formed using a set of candidate predictors called the predictor set. Each candidate predictor represents the motion vector(s) of a causal neighbor block (a block in the neighborhood whose motion vector(s) is/are already signaled) of the target block (block whose motion vector(s) is/are being signaled). FIG. 1 illustrates causal neighbor blocks L and T that are used to construct predictors for the motion vector block C.

Constructing a Predictor Set

In one embodiment, for a bi-predictive block, the construction of the predictor set can be done in such a way that the candidate predictor added corresponding to a causal neighbor block need not exactly represent the motion vector(s) of the neighbor block. In one embodiment, the candidate predictor's motion vector for a list is set equal to neighbor block's motion vector for the same list if the target block and neighbor block refer to same reference frames for that list; else, the candidate predictor's motion vector for that list is set to invalid status.

Figure 2:
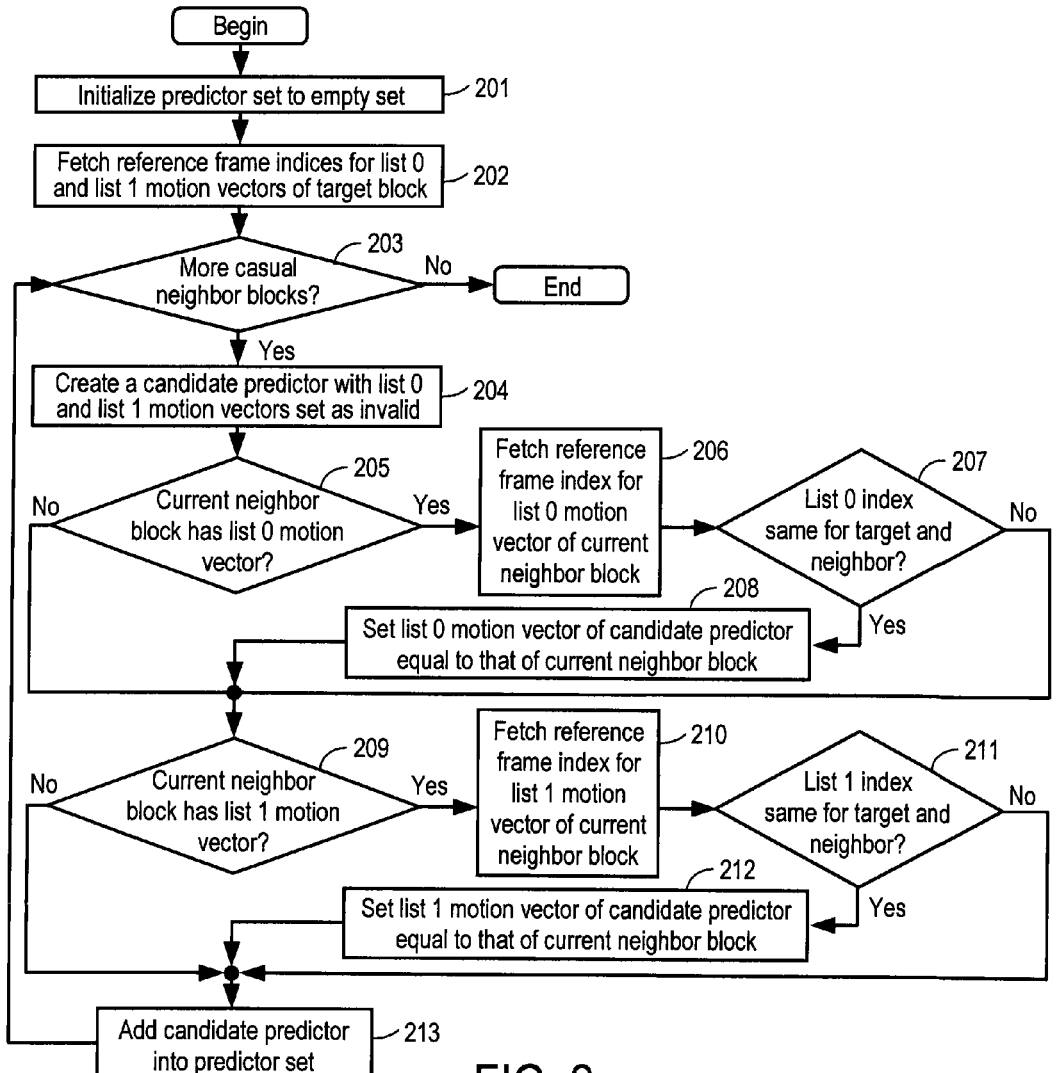
FIG. 2 is a flow diagram of one embodiment of a process for constructing a predictor set.

FIG. 2 is a flow diagram of one embodiment of a process for constructing a predictor set. The process is performed by processing logic that may comprise hardware, software, or a combination of both.

Referring to FIG. 2, the process begins by processing logic initializing a predictor set to an empty set (processing block 201). Next, processing logic fetches reference frame indices for list 0 and list 1 motion vectors of a target block (processing block 202). Thereafter, processing logic determines whether there are more causal neighbor blocks (processing block 203). If not, the process ends. If there are more causal neighbor blocks, the process transitions to processing block 204 where the processing logic creates a candidate predictor with list 0 and list 1 motion vectors set as invalid.

Processing logic then determines whether the current neighbor block has a list 0 motion vector (processing block 205). If not, the process transitions to processing block 209. If it does, the process transitions to processing block 206 where processing logic fetches the reference frame index for the list 0 motion vector of the current neighbor block and then determines whether the list 0 reference frame index is the same for the target block and the neighbor block (processing block 207). If so, processing logic sets the list 0 motion vector of the candidate predictor equal to that of the current neighbor block (processing block 208) and the process transitions to processing block 209. If the list 0 reference frame index is not the same for the target block and the neighbor block, the process transitions directly to processing block 209.

At processing block 209, processing logic determines whether the current neighbor block has a list 1 motion vector. If not, the process transitions to processing block 213. If the current neighbor block does have a list 1 motion vector, processing logic fetches the reference frame index for the list 1 motion vector of the current neighbor block (processing block 210). Next, processing logic tests whether the list 1 reference frame index is the same for the target and the neighbor (processing block 211). If it is, processing logic sets the list 1 motion vector of the candidate predictor equal to that of the current neighbor block (processing block 212) and the process transitions to processing block 213. If not, the process transitions directly to processing block 213.

At processing block 213, processing logic adds the candidate predictor into the predictor set and then the process transitions to processing block 203.

Refining the Predictor Set

Figure 3:
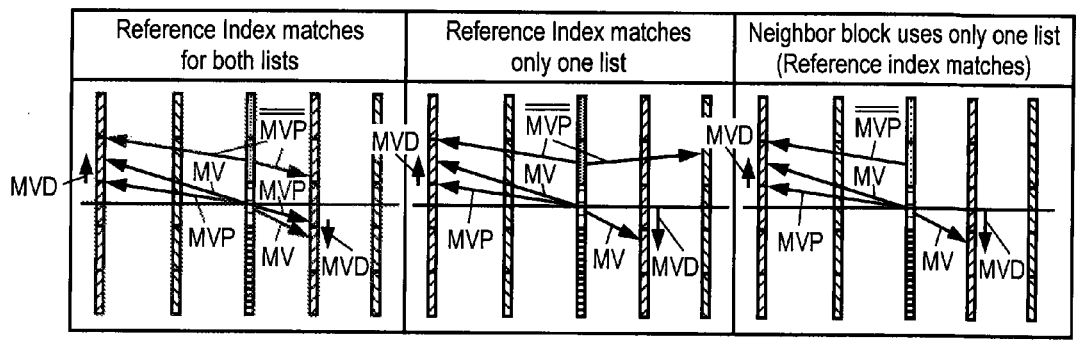
FIG. 3 illustrates cases for which a predictor is constructed from a neighbor block.

In one embodiment, the predictor set is refined by constructing a predictor from a neighbor block when the reference frame index matches for one of the two lists of reference frames. This occurs when a reference index matches only one list or when the neighbor block uses only one list. FIG. 3 illustrates cases for which a predictor is constructed from a neighbor block.

In one embodiment, the predictor set is refined by refining one (or more) candidate predictors in the predictor set as described below: if the candidate predictor's motion vector corresponding to one list (list a), $MVP_a$, is valid and the candidate predictor's motion vector corresponding to the other list (list b), $MVP_b$, is invalid, a valid value for $MVP_b$ is calculated using $MVP_a$.

$$MVP_b = f_{pred}(MVP_a, T_a, T_b)$$

For purposes herein, $T_a$ and $T_b$ represent the signed temporal distances from the current frame to the reference frames referred by $MV_a$ and $MV_b$ respectively.

Figure 4:
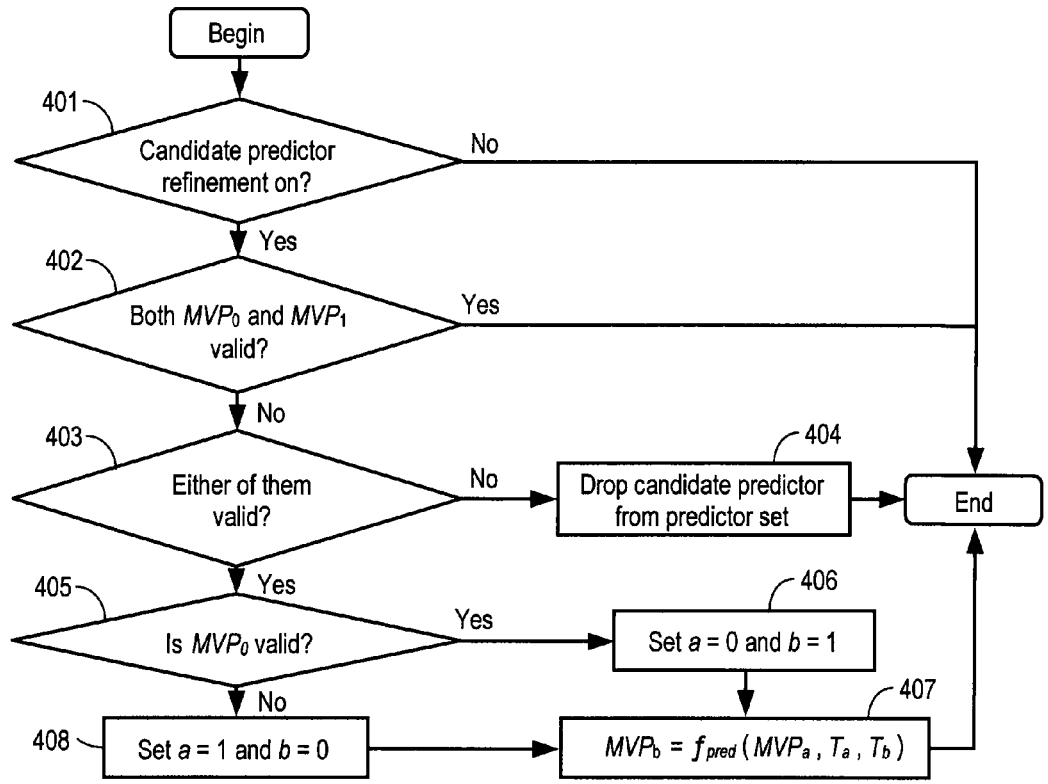
FIG. 4 is a flow diagram of one embodiment of a process for refining a candidate predictor.

In one embodiment, if the candidate predictor refinement flag is 'on', the candidate predictor is refined. FIG. 4 is the flow diagram of one embodiment of a process for refining a candidate predictor based on the status of the candidate predictor refinement flag. The process is performed by a processing logic that may comprise hardware, software, or a combination of both.

Referring to FIG. 4, the process begins by processing logic determining whether the candidate predictor refinement flag is on (processing block 401). If not, the process ends. If it is, the process transitions to processing block 402 where processing logic determines whether both $MVP_0$ and $MVP_1$ are valid. If they are, the process ends. If not, the process transitions to processing block 403, where processing logic tests whether either $MVP_0$ or $MVP_1$ is valid. If not, the process transitions to processing block 404 where the processing logic drops the candidate predictor from the predictor set and then the process ends. If either $MVP_0$ or $MVP_1$ is valid, the process transitions to processing block 405 where processing logic determines whether $MVP_0$ is valid. If it is, processing logic sets a equal to 0 and b equal to 1 (processing block 406) and sets $MVP_b$ equal to $f_{pred}(MVP_a, T_a, T_b)$ (processing block 407) and then the process ends. If processing logic determines that $MVP_0$ is not valid, processing logic sets a equal to 1 and b equal to 0 (processing block 408) and sets $MVP_b$ equal to $f_{pred}(MVP_a, T_a, T_b)$ at processing block 407. Thereafter, the process ends.

In one embodiment, the candidate predictor refinement flag is 'on' for all candidate predictors.

In one embodiment, the candidate predictor refinement flag is 'on' only when one (or more) constraints are satisfied. In alternative embodiments, the constraints enforced can be one (or more) of the following:

1.
$$\frac{MVP_a^T \times \overline{MVP_b}}{\|MVP_a\|_2 \times \|\overline{MVP_b}\|_2} > \overline{\delta},$$

where $\overline{\delta}$ is a predetermined parameter. In one embodiment, $\overline{\delta}$ is equal to zero.

2. The sign of each element in $MVP_a \times T_a$ matches the sign of the corresponding element in $\overline{MVP_b} \times \overline{T_b}$.

3. The sign of one element in $MVP_a \times T_a$ matches the sign of the corresponding element in $\overline{MVP_b} \times \overline{T_b}$.

4. The sign of each element in $MVP_a$ matches the sign of the corresponding element in $\overline{MVP_b}$.

5. The sign of one element in $MVP_a$ matches the sign of the corresponding element in $\overline{MVP_b}$.

For purposes herein, $\overline{MVP_b}$ is the list b motion vector of the neighbor block represented by the candidate predictor and $\overline{T_b}$ represents the signed temporal distance from the current frame to the reference frame referred by $\overline{MVP_b}$.

In alternative embodiments, the function $f_{pred}(MVP_a, T_a, T_b)$ can be one of the following:

1. $f_{pred}(MVP_a, T_a, T_b) = ((MVP_a \times T_b \times f_T(T_a) + (1 << (N_{prec1} - 1))) >> N_{prec1})$, where $f_T(T_a)$ is a lookup table whose entries are filled such that $$f_T(x) = \frac{1 << N_{prec1}}{x}$$

and $N_{prec1}$ is a pre-determined positive integer.

2.
$$f_{pred}(MVP_a, T_a, T_b) = \frac{MVP_a \times T_b}{T_a}$$

3. $f_{pred}(MVP_a, T_a, T_b) = MVP_a$
4. $f_{pred}(MVP_a, T_a, T_b) = MVP_a \times f_{scale}(T_a, T_b)$, where $f_{scale}(T_a, T_b)$ is a lookup table.
5. $f_{pred}(MVP_a, T_a, T_b)$ is a lookup table.

Figure 5:
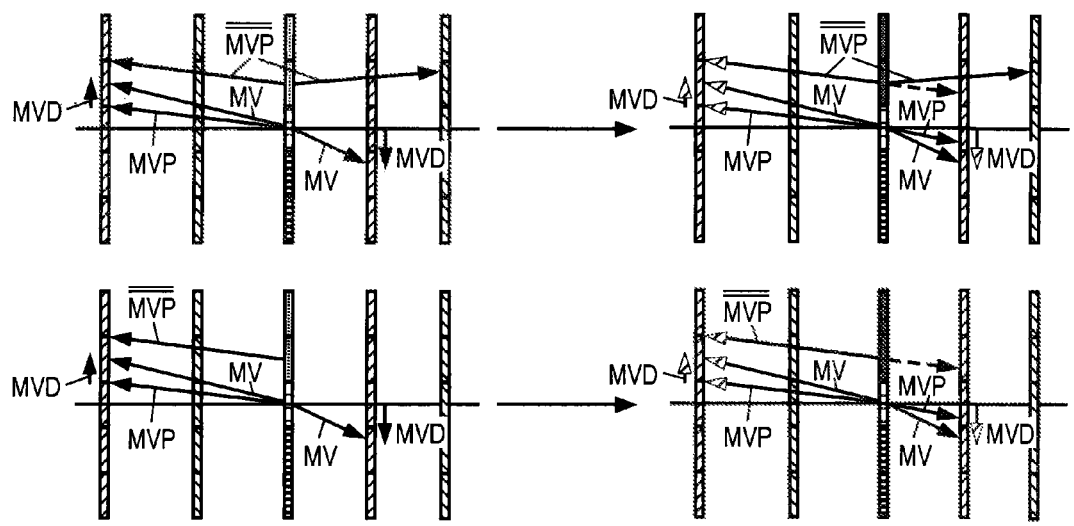
FIG. 5 illustrates an example of generating a MVP.

FIG. 5 illustrates an example of generating a MVP for two cases where the MVP is only available for one list. In this case, the function used is option '2' above.

Deriving Motion Vector Predictors

Figure 6:
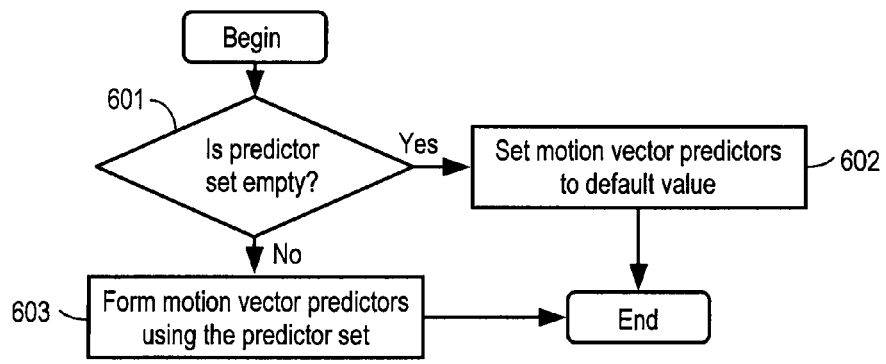
FIG. 6 is a flow diagram of one embodiment of a process for deriving motion vector predictors.

In one embodiment, if the predictor set is not empty, the motion vector predictors ($\overline{MVP_0}$ and $\overline{MVP_1}$) are formed using the candidate predictors in the predictor set; otherwise, the motion vector predictors for both lists are set to a default value. FIG. 6 is a flow diagram of one embodiment for the process for deriving motion vector predictors. The process may be performed by processing logic that may comprise hardware, software, or a combination of both.

Referring to FIG. 6, the process begins by processing logic determining whether the predictor set is empty (processing block 601). If it is, processing logic sets the motion vector predictors to a default value (processing block 602) and the process ends. If not, processing logic forms motion vector predictors using the predictor set (processing block 603) and the process ends. In one embodiment, the default value is the zero vector $$\left(\begin{bmatrix}0\\0\end{bmatrix}\right).$$

In alternative embodiments, motion vector predictors are formed using the predictor set in one of the following methods. For the following methods, the notation $PS = \{CP_i: 1 \leq i \leq N_{CPS}\}$ is used for the predictor set, where $CP_i$ represents the $i^{th}$ candidate predictor and $N_{CPS}$ represents the total number of candidate predictors in the predictor set.

1. $\overline{MVP_0}$ and $\overline{MVP_1}$ is set equal to the motion vectors for list 0 and list 1 respectively for the candidate predictor $CP_i$. The index 'i' of the candidate predictor is included as part of the video bitstream when $N_{CPS} > 1$.

2. $\overline{MVP_0}$ is set equal to the median of list 0 motion vectors of all candidate predictors in the predictor set. $\overline{MVP_1}$ is set equal to the median of list 1 motion vectors of all candidate predictors in the predictor set.

Differential Motion Vector Computation and Motion Vector Reconstruction

In one embodiment, for a bi-predictive block, the differential motion vector for one list (list c) can also be used in computing the differential motion vector of the other list (list d).

$$MVD_c = MV_c - \overline{MVP_c}$$

$$MVD_d = MV_d - f_{diff}(\overline{MVP_d}, MVD_c, T_c, T_d)$$

Figure 7:
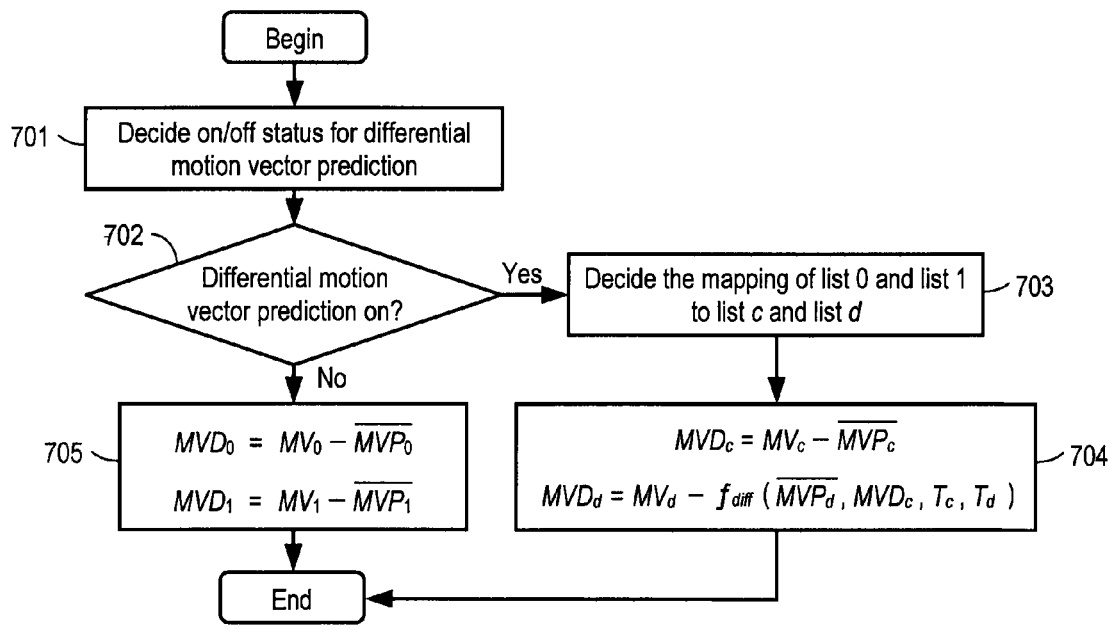
FIG. 7 is a flow diagram of one embodiment of a process for computing differential motion vectors at an encoder.

For purposes herein, $T_c$ and $T_d$ represent the signed temporal distances from the current frame to the reference frames referred by $MV_c$ and $MV_d$ respectively. FIG. 7 is a flow diagram of one embodiment of a process for computing the differential motion vectors at the encoder. The process is performed by processing logic that may comprise hardware, software, or a combination of both.

Referring to FIG. 7, the process begins by processing logic deciding the on/off status for differential motion vector prediction (processing block 701). Next, processing logic determines whether the status of differential motion vector prediction is on (processing block 702). If it is, processing logic decides the mapping of list 0 and list 1 to list c and list d (processing block 703) and sets the motion vector differential for c and d according to the following formulas:

$$MVD_c = MV_c - \overline{MVP_c}$$

$$MVD_d = MV_d - f_{diff}(\overline{MVP_d}, MVD_c, T_c, T_d)$$

(processing block 704) and the process thereafter ends.

If the status of differential motion vector prediction is not on, the processing logic sets the differential motion vector for list 0 and list 1 according to the following formulas:

$$MVD_0 = MV_0 - \overline{MVP_0}$$

$$MVD_d = MV_d - f_{diff}(\overline{MVP_d}, MVD_c, T_c, T_d)$$

(processing block 705), and then the process ends.

Figure 8:
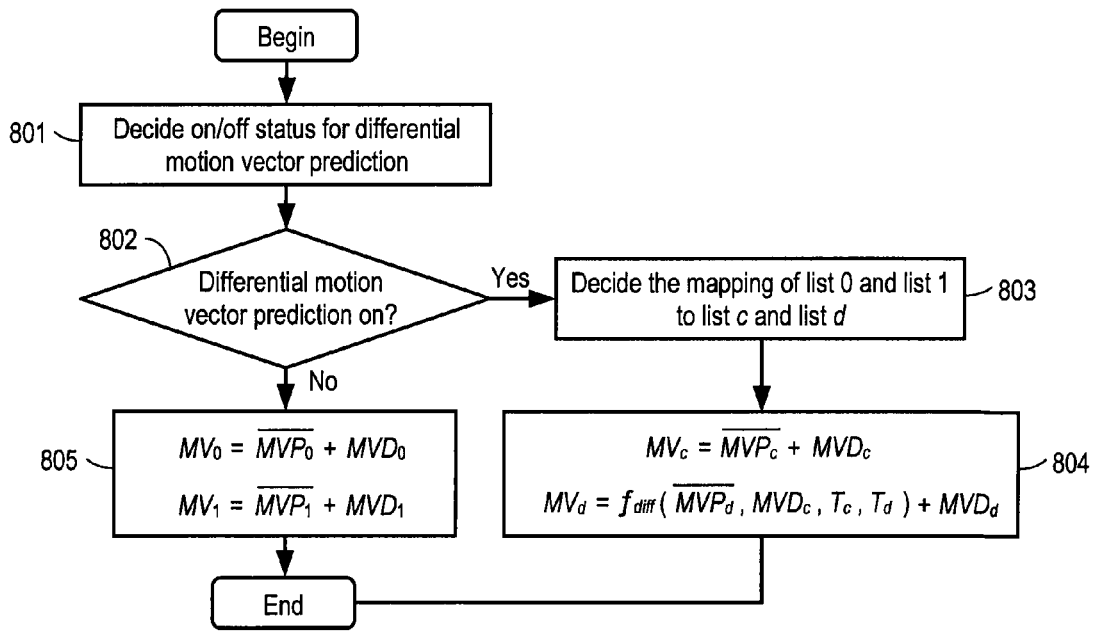
FIG. 8 is a flow diagram of one embodiment of a process for reconstructing motion vectors at a decoder.

FIG. 8 is a flow diagram of one embodiment of a process for reconstructing the motion vectors at the decoder. The process is performed by processing logic that may comprise hardware, software, or a combination of both.

Referring to FIG. 8, the process begins by processing logic deciding the on/off status for differential motion vector prediction (processing block 801). Next, processing logic determines whether the status of differential motion vector prediction is on (processing block 802). If it is, processing logic decides the mapping of list 0 and list 1 to list c and list d (processing block 803) and sets the motion vector for c and d according to the following formulas:

$$MV_c = \overline{MVP_c} + MVD_c$$

$$MV_d = f_{diff}(\overline{MVP_d}, MVD_c, T_c, T_d) + MVD_d$$

(processing block 804) and the process thereafter ends.

If the status of differential motion vector prediction is not on, processing logic sets the motion vector for list 0 and list 1 according to the following formulas:

$$MV_0 = \overline{MVP_0} + MVD_0$$

$$MV_1 = \overline{MVP_1} + MVD_1$$

(processing block 805), and then the process ends.

In a further embodiment, the approach $MVD_d = MV_d - f_{diff}(\overline{MVP_d}, MVD_c, T_c, T_d)$ (in other words, status of differential motion vector prediction is set to on) is only used when one (or more) constraints are satisfied; otherwise, the standard approach $MVD_d = MV_d - \overline{MVP_d}$ is used (in other words, status of differential motion vector prediction is set to off). In alternative embodiments, the constraints enforced can be one (or) more of the following:

1.

$$\frac{\overline{MVP_c}^T \times \overline{MVP_d}}{\|\overline{MVP_c}\|_2 \times \|\overline{MVP_d}\|_2} > \overline{\delta},$$

where $\overline{\delta}$ is a predetermined parameter. In one embodiment, $\overline{\delta}$ is equal to zero.

2. The sign of each element in $\overline{MVP_c} \times T_c$ matches the sign of the corresponding element in $\overline{MVP_d} \times T_d$.

3. The sign of one element in $\overline{MVP_c} \times T_c$ matches the sign of the corresponding element in $\overline{MVP_d} \times T_d$.

4. The sign of each element in $\overline{MVP_c}$ matches the sign of the corresponding element in $\overline{MVP_d}$.

5. The sign of one element in $\overline{MVP_c}$ matches the sign of the corresponding element in $\overline{MVP_d}$.

In alternative embodiments, c and d are determined in one of the following ways:

1. If $|T_0| < |T_1|$, c=0 and d=1; otherwise, c=1 and d=0.
2. If $|T_0| > |T_1|$, c=1 and d=0; otherwise, c=0 and d=1.

In alternative embodiments, the function $f_{diff}(\overline{MVP_d}, MVD_c, T_c, T_d)$ can be one of the following:

1. $f_{diff}(\overline{MVP_d}, MVD_c, T_c, T_d) = \overline{MVP_d} + ((MVD_c \times T_d \times f_T(T_c) + (1 << (N_{prec2} - 1))) >> N_{prec2})$, where $f_T(T_c)$ is a lookup table whose entries are filled such that $$f_T(x) = \frac{1 << N_{prec2}}{x}$$

and $N_{prec2}$ is a pre-determined positive integer.

2.

$$f_{diff}(\overline{MVP_d}, MVP_c, T_c, T_d) = \overline{MVP_d} + \frac{MVD_c \times T_d}{T_c}$$

3. $f_{diff}(\overline{MVP_d}, MVD_c, T_c, T_d) = \overline{MVP_d} + MVD_c$
4. $f_{diff}(\overline{MVP_d}, MVD_c, T_c, T_d) = \overline{MVP_d} + MVD_c \times f_{scale}(T_c, T_d)$ where $f_{scale}(T_c, T_d)$ is a lookup table.
5. $f_{diff}(\overline{MVP_d}, MVD_c, T_c, T_d) = \overline{MVP_d} + \hat{f}_{diff}(MVD_c, T_c, T_d)$, where $\hat{f}_{diff}(MVD_c, T_c, T_d)$ is a lookup table.
6. $f_{diff}(\overline{MVP_d}, MVD_c, T_c, T_d)$ is a lookup table.

Figure 9:
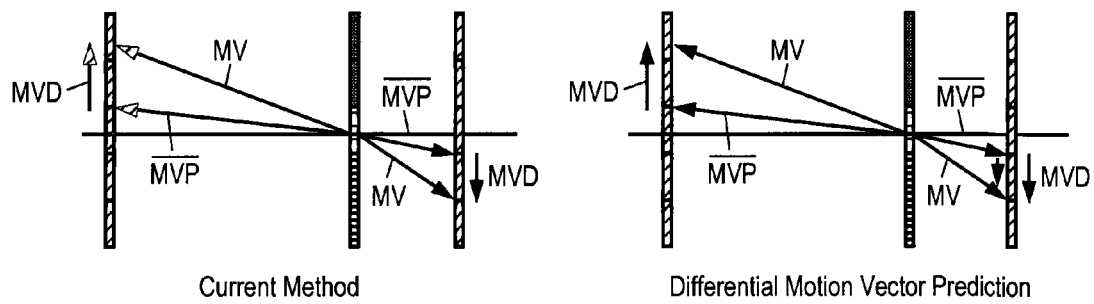
FIG. 9 illustrates an example of scaling one MVD to predict a second MVD.

FIG. 9 illustrates an example of scaling MVD of one list to predict the MVD of the other list using option '2' above.

Figure 10:
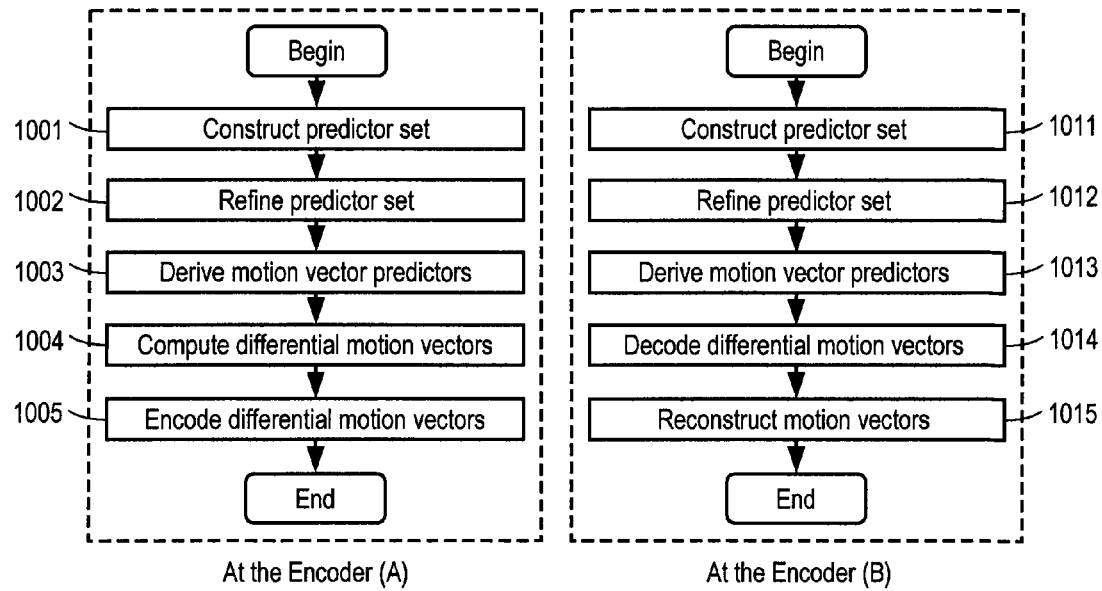
FIGS. 10A and B are flow diagrams of embodiments of processes for coding motion vectors at an encoder and a decoder, respectively.

FIGS. 10A and 10B are flow diagrams describing the process of encoding motion vectors at the encoder and the process of decoding motion vectors at the decoder, respectively. The processes are performed by processing logic that may comprise hardware, software, or a combination of both.

Referring to FIG. 10A, the process of coding motion vectors at the encoder begins by processing logic constructing a predictor set (processing block 1001). Next, processing logic refines the predictor set (processing block 1002) and derives motion vector predictors (processing block 1003). After deriving motion vector predictors, processing logic computes differential motion vectors (processing block 1004) and encodes the differential motion vectors (processing block 1005). Thereafter the process ends.

Referring to FIG. 10B, the process for decoding motion vectors at the decoder begins by processing logic constructing a predictor set (processing block 1011), refining the predictor set (processing block 1012), and deriving motion vector predictors (processing block 1013). Processing logic decodes differential motion vectors (processing block 1014) and reconstructs the motion vectors using the derived motion vector predictors (processing block 1015). Thereafter, the process ends.

Figure 11:
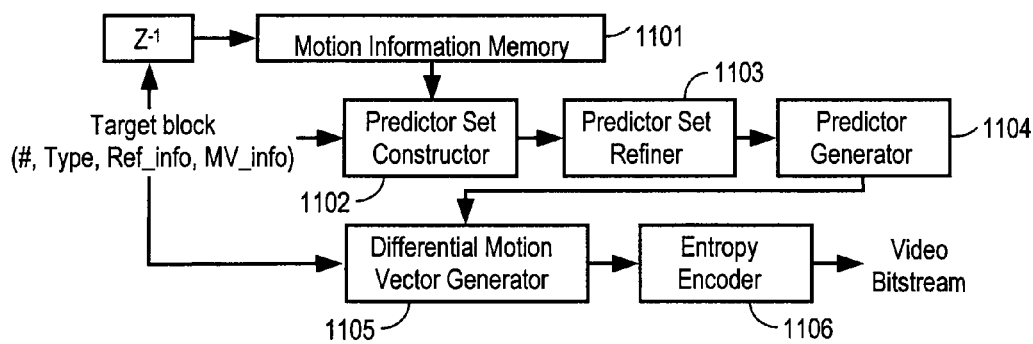
FIG. 11 is a block diagram for a motion vector encoder.

FIG. 11 is a block diagram for an exemplary motion vector encoder which would be part of a video encoder. The attributes used for the target block in FIGS. 11 (and 12) are described as follows:

: This represents the index of the target block which can be used to identify its causal neighbor blocks.
Type: This indicates the lists used by the target block.
Ref_info: This represents the reference frame information for each list used.

MV_info: This represents the motion vectors for each list used.

Referring to FIG. 11, a motion information memory 1101 stores the attributes of previously encoded blocks. In response to receiving a target block and motion information from motion information memory 1101, predictor set constructor 1102 constructs a predictor set. In one embodiment, this is constructed as described above in FIG. 2. After constructing the predictor set, predictor set refiner 1103 refines the predictor set. In one embodiment, refining of the predictor set includes the refinement of one (or) more candidate predictors. In one embodiment, the refinement of a candidate predictor is performed as set forth in FIG. 4 above. After predictor set refiner 1103 refines the predictor set, predictor generator 1104 derives the motion vector predictors. In one embodiment, predictor generator 1104 derives the motion vector predictors as set forth in FIG. 6 above. Predictor generator 1104 sends the derived motion vector predictors to differential motion vector generator 1105 which, in response to the motion vector predictors and the motion vectors of the target block, computes the differential motion vectors. Differential motion vector generator 1105 sends the computed differential motion vectors to entropy encoder 1106 which encodes the differential motion vectors and includes them as part of the video bitstream. Thereafter, the attributes of the target block are sent to the motion information memory 1101 for storage (The $Z^{-1}$ in the block diagram indicates that this does not happen until the motion vectors of target block are encoded).

Figure 12:
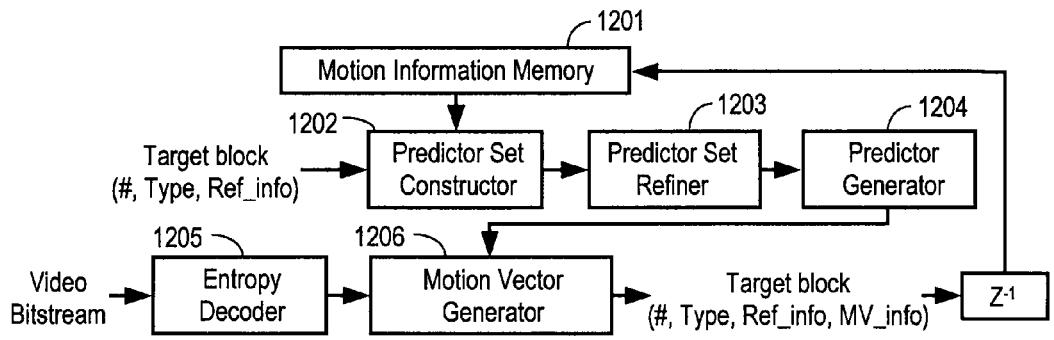
FIG. 12 is a block diagram for a motion vector decoder.

FIG. 12 is a block diagram for an exemplary motion vector decoder which would be part of a video decoder. Referring to FIG. 12, a motion information memory 1201 stores the attributes of previously decoded blocks. A predictor set constructor 1202 receives motion information from motion information memory 1201 and target block information. In response to these inputs, predictor set constructor 1202 constructs a predictor set. In one embodiment, the construction of the predictor set is performed as set forth in FIG. 2 above. Predictor set constructor 1202 sends the predictor set to predictor set refiner 1203 which refines the predictor set. In one embodiment, refining of the predictor set includes the refinement of one (or) more candidate predictors. In one embodiment, the refinement of a candidate predictor is performed as set forth in FIG. 4 above. Predictor set refiner 1203 sends the refined predictor set to predictor generator 1204. In response to the refined predictor set, predictor generator 1204 derives motion vector predictors. In one embodiment, predictor generator 1204 derives the motion vector predictors as set forth in FIG. 6 above. Predictor generator 1204 sends the derived motion vector predictors to motion vector generator 1206.

Entropy decoder 1205 receives the video bit stream and performs entropy decoding on the video bitstream. This generates a decoded bitstream that includes decoded differential motion vectors. Entropy decoder 1205 sends the decoded differential motion vectors to motion vector generator 1206. In response to the derived motion vector predictors and the decoded differential motion vectors, motion vector generator 1206 reconstructs the motion vectors for the target block. Thereafter, motion vector generator 1206 sends the reconstructed motion vectors to be included in the attributes of the target block. Finally, the attributes of the target block are sent to the motion information memory 1201 for storage (The $Z^{-1}$ in the block diagram indicates that this does not happen until the motion vectors of target block are reconstructed).

Note that the motion vector encoders and decoders described herein can be part of any block-based hybrid video encoders/decoders that are well known in the art.

An Example of a Computer System

Figure 13:
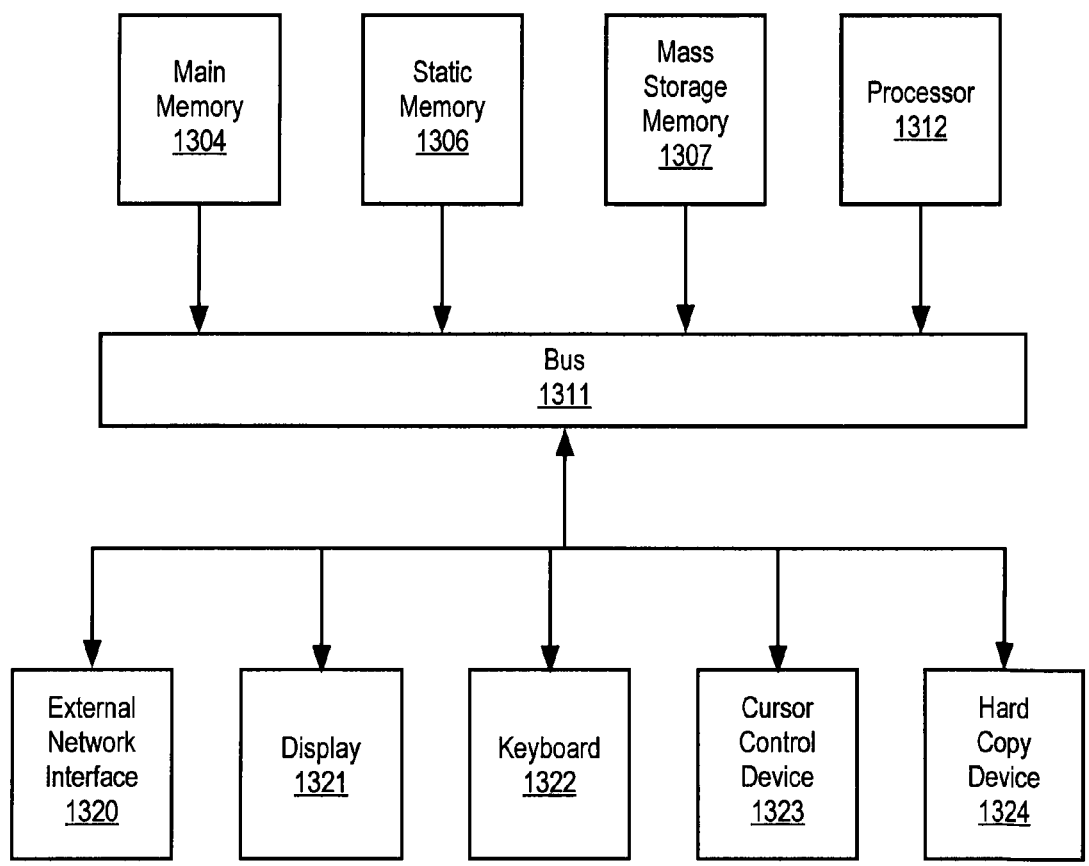
FIG. 13 is a block diagram of a computer system.

FIG. 13 is a block diagram of an exemplary computer system that may perform one or more of the operations described herein. Referring to FIG. 13, computer system 1300 may comprise an exemplary client or server computer system. Computer system 1300 comprises a communication mechanism or bus 1311 for communicating information, and a processor 1312 coupled with bus 1311 for processing information. Processor 1312 includes a microprocessor, but is not limited to a microprocessor, such as, for example, Pentium™, PowerPC™, Alpha™, etc.

System 1300 further comprises a random access memory (RAM), or other dynamic storage device 1304 (referred to as main memory) coupled to bus 1311 for storing information and instructions to be executed by processor 1312. Main memory 1304 also may be used for storing temporary variables or other intermediate information during execution of instructions by processor 1312.

Computer system 1300 also comprises a read only memory (ROM) and/or other static storage device 1306 coupled to bus 1311 for storing static information and instructions for processor 1312, and a data storage device 1307, such as a magnetic disk or optical disk and its corresponding disk drive. Data storage device 1307 is coupled to bus 1311 for storing information and instructions.

Computer system 1300 may further be coupled to a display device 1321, such as a cathode ray tube (CRT) or liquid crystal display (LCD), coupled to bus 1311 for displaying information to a computer user. An alphanumeric input device 1322, including alphanumeric and other keys, may also be coupled to bus 1311 for communicating information and command selections to processor 1312. An additional user input device is cursor control 1323, such as a mouse, trackball, trackpad, stylus, or cursor direction keys, coupled to bus 1311 for communicating direction information and command selections to processor 1312, and for controlling cursor movement on display 1321.

Another device that may be coupled to bus 1311 is hard copy device 1324, which may be used for marking information on a medium such as paper, film, or similar types of media. Another device that may be coupled to bus 1311 is a wired/wireless communication capability 1325 to communication to a phone or handheld palm device.

Note that any or all of the components of system 1300 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   deriving N motion vector predictors for a first block that has N motion vectors corresponding to N lists of reference frames and a current frame, including constructing one of the N motion vector predictors when a second block that neighbors the first block and is used for prediction has at least one invalid motion vector, where N is an integer greater than 1, wherein constructing one of the N motion vector predictors in a first list of the N lists is performed by applying a function to another of the other N motion vector predictors in a second list of the N lists different than the first list and signed temporal distances from the current frame to the reference frames associated with each motion vector in the N motion vectors of the first block;

generating N differential motion vectors based on the N motion vectors and N motion vector predictors; and encoding the N differential motion vectors.

2. The method defined in claim 1 wherein deriving N motion vector predictors comprises deriving a pair of motion vector predictors, and wherein the first block has a pair of motion vectors that correspond to two lists of reference frames.

3. The method defined in claim 2 wherein the second block has at least one invalid motion vector if the reference frame used by the motion vector of second block does not match the reference frame used by the motion vector of first block for at least one of the two lists of reference frames or if the second block does not use both lists of reference frames.

4. The method defined in claim 2 wherein constructing one of the pair of motion vector predictors is performed by applying a function that is based on the other motion vector predictor in the pair and signed temporal distances from the current frame to the reference frames associated with each motion vector in the pair of motion vectors of the first block.

5. The method defined in claim 4 wherein constructing one of the pair of motion vector predictors comprises, when the second block has at least one invalid motion vector because the reference frame used by the motion vector of second block does not match the reference frame used by the motion vector of first block for at least one of the two lists of reference frames, extrapolating a valid motion vector of the second block corresponding to one list to a reference frame on the other list.

6. A method comprising:

deriving N motion vector predictors for a first block that has N motion vectors corresponding to N lists of reference frames and a current frame, including constructing one of the N motion vector predictors when a second block that neighbors the first block and is used for prediction has at least one invalid motion vector, where N is an integer greater than 1, wherein deriving N motion vector predictors comprises deriving a pair of motion vector predictors, wherein the first block has a pair of motion vectors that correspond to two lists of reference frames, wherein constructing one of the pair of motion vector predictors comprises, when the second block has at least one invalid motion vector because the reference frame used by the motion vector of second block does not match the reference frame used by the motion vector of first block for at least one of the two lists of reference frames, extrapolating a valid motion vector of the second block corresponding to one list to a reference frame on the other list, and wherein the function is one selected from a group consisting of:

$((MVP_a \times T_b \Delta f_T(T_a) + (1 << (N_{prec1}-1))) >> N_{prec1})$, where $f_T(T_a))$ is a lookup table whose entries are filled such that $$f_T(x) = \frac{1 << N_{prec1}}{x}$$

and $N_{prec1}$ is a pre-determined positive integer;

$$\frac{MVP_a \times T_b}{T_a};$$

the other motion vector predictor;

$MVP_a \times f_{scale}(T_a, T_b)$, where $f_{scale}(T_a, T_b)$ is a lookup table; and a lookup table, where $MVP_a$ is the other motion vector predictor in the pair and $T_a$ and $T_b$ represent the signed temporal distances from the current frame to the reference frames associated with each motion vector in the pair of motion vectors of the first block;

generating N differential motion vectors based on the N motion vectors and N motion vector predictors; and encoding the N differential motion vectors.

7. The method defined in claim 1 wherein the one motion vector predictor constructed is used only if the invalid motion vector of the second block satisfies a constraint with respect to a valid motion vector of the second block.

8. The method defined in claim 1 wherein generating one of the N differential motion vectors comprises performing a function using another differential motion vector.

9. An encoding apparatus comprising:

a motion vector predictor module to derive N motion vector predictors for a first block that has N motion vectors corresponding to N lists of reference frames and a current frame, including constructing one of the N motion vector predictors when a second block that neighbors the first block and is used for prediction has at least one invalid motion vector, where N is an integer greater than 1, wherein constructing one of the N motion vector predictors in a first list of the N lists is performed by applying a function to another of the other N motion vector predictors in a second list of the N lists different than the first list and signed temporal distances from the current frame to the reference frames associated with each motion vector in the N motion vectors of the first block;

a differential motion vector generator to generate N differential motion vectors based on the N motion vectors and the N motion vector predictors; and an entropy encoder to encode the N differential motion vectors.

10. The apparatus defined in claim 9 wherein the second block has at least one invalid motion vector if the reference frame used by the motion vector of second block does not match the reference frame used by the motion vector of first block for at least one of the N lists of reference frames or if the second block does not use all N lists of reference frames.

11. The apparatus defined in claim 9 wherein a motion vector predictor module is operable to apply a function to construct one motion vector predictor wherein the function is based on another motion vector predictor among the N motion vector predictors and signed temporal distances from the current frame to the reference frames associated with the motion vectors of the first block corresponding to the two motion vector predictors involved in the function.

12. The apparatus defined in claim 9 wherein the differential motion vector generator is operable to generate one of the N differential motion vectors by performing a function using another differential motion vector.

13. The apparatus defined in claim 12 wherein the function is a scaling function so that the another differential motion vector is scaled to predict the differential motion vector being generated.

14. A decoding apparatus comprising:
an entropy decoder to receive a bitstream and decode the bitstream to create a decoded bitstream with differential motion vectors;
a motion vector predictor module to derive N motion vector predictors for a first block that has N differential motion vectors corresponding to N lists of reference frames and a current frame, including constructing one of the N motion vector predictors when a second block that neighbors the first block and is used for prediction has at least one invalid motion vector, where N is an integer greater than 1, wherein constructing one of the N motion vector predictors in a first list of the N lists is performed by applying a function to another of the other N motion vector predictors in a second list of the N lists different than the first list and signed temporal distances from the current frame to the reference frames associated with each motion vector in the N motion vectors of the first block; and
a motion vector generator to generate N motion vectors based on the N differential motion vectors from the decoded bitstream and the N motion vector predictors.

15. The apparatus defined in claim 14 wherein the second block has at least one invalid motion vector if the reference frame used by the motion vector of second block does not match the reference frame used by the motion vector of first block for at least one of the N lists of reference frames or if the second block does not use all N lists of reference frames.

16. The apparatus defined in claim 14 wherein predictor set refiner is operable to apply a function to refine a motion vector predictor, wherein the function is based on another motion vector predictor and signed temporal distances from the current frame to the reference frames associated with the motion vectors of the first block corresponding to the two motion vector predictors involved in the function.

17. The apparatus defined in claim 14 wherein the decoder is operable to generate one of the N motion vectors by performing a function using another differential motion vector in addition to the differential motion vector normally used in generating the motion vector.

18. A non-transitory computer-readable storage medium storing executable instructions thereon which when executed by a system cause the system to perform a method comprising:
deriving N motion vector predictors for a first block that has N motion vectors corresponding to N lists of reference frames and a current frame, including constructing one of the N motion vector predictors when a second block that neighbors the first block and is used for prediction has at least one invalid motion vector, where N is an integer greater than 1, wherein constructing one of the N motion vector predictors in a first list of the N lists is performed by applying a function to another of the other N motion vector predictors in a second list of the N lists different than the first list and signed temporal distances from the current frame to the reference frames associated with each motion vector in the N motion vectors of the first block;
generating N differential motion vectors based on the N motion vectors and the N motion vector predictors; and
encoding the N differential motion vectors.

19. The computer-readable storage medium defined in claim 18 wherein the second block has at least one invalid motion vector if the reference frame used by the motion vector of second block does not match the reference frame used by the motion vector of first block for at least one of the N lists of reference frames or if the second block does not use all N lists of reference frames.

20. The computer-readable storage medium defined in claim 18 wherein constructing one of the N motion vector predictors is performed by applying a function, wherein the function is based on another motion vector predictor among the N motion vector predictors and signed temporal distances from the current frame to the reference frames associated with the motion vectors of the first block corresponding to the two motion vector predictors involved in the function.

21. The computer-readable storage medium defined in claim 20 wherein constructing one of the N motion vector predictors comprises, when the second block has at least one invalid motion vector because the reference frame used by the motion vector of second block does not match the reference frame used by the motion vector of first block for at least one of the N lists of reference frames, extrapolating a valid motion vector of the second block corresponding to one list to a reference frame on another list.

22. A method comprising:
generating N differential motion vectors based on N motion vectors and N motion vector predictors, wherein generating one of the N differential motion vectors comprises performing a function using another differential motion vector, where N is an integer greater than 1, wherein one of the N motion vector predictors in a first list of the N lists is constructed by applying a function to another of the other N motion vector predictors in a second list of the N lists different than the first list and signed temporal distances from a current frame to reference frames associated with each motion vector in the N motion vectors of a first block; and
encoding the N differential motion vectors.

23. The method defined in claim 22 wherein the function is a scaling function so that the another differential motion vector is scaled to predict the differential motion vector being generated.

24. A non-transitory computer-readable storage medium storing executable instructions thereon which when executed by a system cause the system to perform a method comprising:
generating N differential motion vectors based on N motion vectors and N motion vector predictors, wherein generating one of the N differential motion vectors comprises performing a function using another differential motion vector, where N is an integer greater than 1, wherein one of the N motion vector predictors in a first list of the N lists is constructed by applying a function to another of the other N motion vector predictors in a second list of the N lists different than the first list and signed temporal distances from a current frame to reference frames associated with each motion vector in the N motion vectors of a first block; and
encoding the N differential motion vectors.

25. The computer-readable storage medium defined in claim 24 wherein the function is a scaling function so that the another differential motion vector is scaled to predict the differential motion vector being generated.

* * * * *